Figure 1:
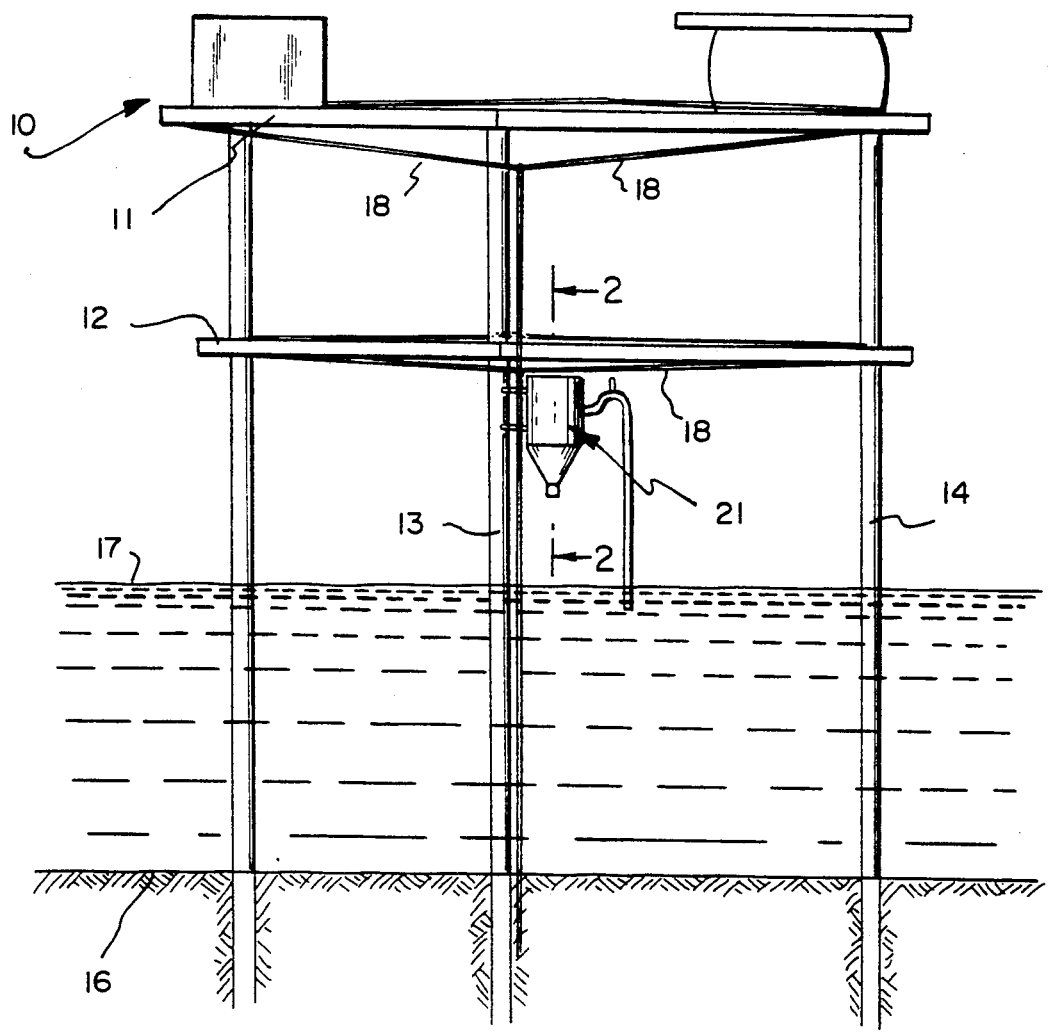

United States Patent [19]
Verret et al.

[11] Patent Number: 5,286,383
[45] Date of Patent: Feb. 15, 1994

[54] WATER-OIL EMULSION SEPARATOR

[75] Inventors: Allen J. Verret, Abita Springs; Bruce D. Cooley, Covington; Malcolm J. Poche', New Orleans, all of La.

[73] Assignee: Texaco Inc., White Plains, N.Y.

[21] Appl. No.: 896,766

[22] Filed: Jun. 10, 1992

[51] Int. Cl.⁵ .............................. C02F 1/40
[52] U.S. Cl. ........................... 210/521; 210/536; 210/540; 210/DIG. 5
[58] Field of Search ............... 210/521, 532.1, 536, 210/538, 540, DIG. 5

[56] References Cited

U.S. PATENT DOCUMENTS

| | | | |
|---|---|---|---|
| 1,248,374 | 11/1917 | Moore | 210/521 |
| 1,423,970 | 7/1922 | Sedelbauer | 210/521 |
| 4,042,512 | 8/1977 | McCarthy et al. | 210/521 |
| 4,064,054 | 12/1977 | Anderson et al. | 210/521 |
| 4,123,365 | 10/1978 | Middebeek | 210/521 |
| 4,278,545 | 7/1981 | Batutis et al. | 210/521 |
| 4,428,841 | 1/1984 | Favret, Jr. | 210/540 |
| 4,722,800 | 2/1988 | Aymong | 210/521 |
| 4,943,370 | 7/1990 | Gortowski | 210/521 |

FOREIGN PATENT DOCUMENTS

| | | |
|---|---|---|
| 1904728 | 9/1969 | Fed. Rep. of Germany . |
| 1535571 | 1/1990 | U.S.S.R. . |
| 2002248 | 2/1979 | United Kingdom . |

Primary Examiner—Christopher Upton
Attorney, Agent, or Firm—James J. O'loughlin

[57] ABSTRACT

A separator or emulsion breaker for separating the emulsion into a hydrocarbon component which is lighter than an aqueous component and having capability for handling excessive amounts of water, the separator, includes a tank having an emulsion permeable partition forming or flow stabilizer within the tank dividing the latter into an entry chamber and a separating compartment. The emulsion permeable stabilizer receives a turbulent stream of incoming emulsion and discharges the same as a relatively quiescent flow in an upward direction to facilitate separation of the hydrocarbon component from the aqueous component. The solids contained in the emulsion flow downwardly into the sand trap. As the lighter component is raised by the rising water surface, it can be removed through a multi-port discharge opening.

4 Claims, 2 Drawing Sheets

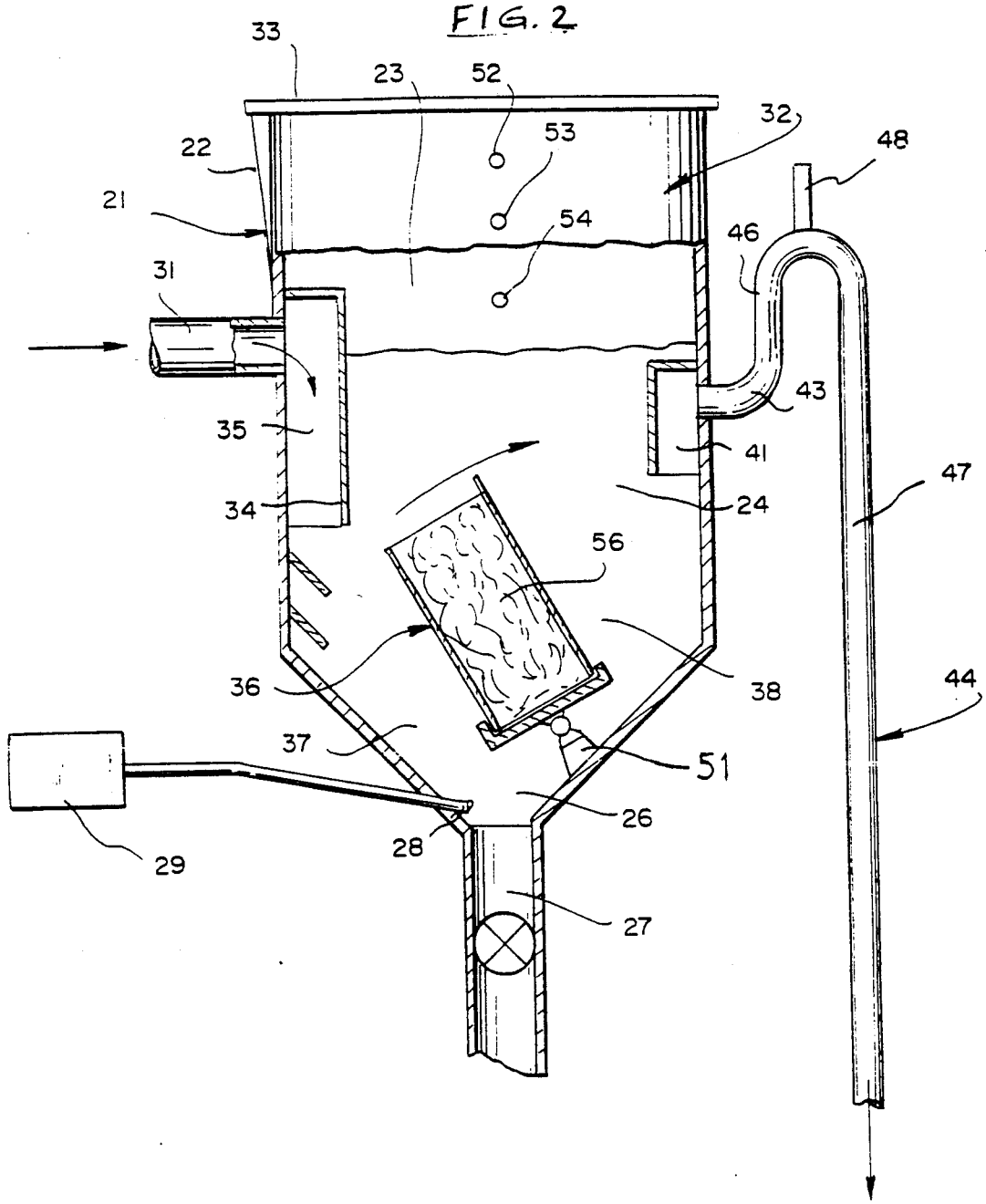

WATER-OIL EMULSION SEPARATOR

BACKGROUND OF THE INVENTION

In any offshore installation for producing crude oil from a substrate beneath the sea floor, the produced flow will normally comprise an emulsion of crude oil, water, and an amount of particulate material, such as sand or the like. To facilitate handling of this emulsion, rather than pumping it immediately ashore it is subjected to on-site separation procedure.

Among the most economical and simple ways to achieve the separation or breaking of the emulsion is through a gravity separator unit, a method which allows the lighter crude oil to rise to the surface of the water while the heavier solid materials gravitate through the water to accumulate on the separator floor.

After the separation has been achieved, the crude oil is retained and stored for shipment or is pumped to a shore-based installation. The water is disposed of through a disposal downcomer, which in effect, discharges it overboard.

With the inception of governmental rules and regulations for preserving the integrity of the environment, great care must be exercised in discharging this water so that amounts of crude oil do not go along with the water. The presence of the crude oil is readily detected by a discoloration on the water surface which, as it spreads about the platform or the drilling vessel, will create a noticeable sheen.

The normal procedure for achieving the desired separation is as noted, by introducing the emulsion to a large enough separator so that a quiescent separation of the two liquids can take place. An apparatus of this type is normally designed to accommodate the anticipated flow of produced material. Thus, the separator's capacity is generally adequate, although limited to a predetermined rate of flow.

A problem introduced into this type of separating apparatus occurs when an excessive and uncontrollable flow of water enters the unit. Such a situation is normally created by an excessive amount of rain, such as experienced during a rainstorm, a hurricane or the like. The accumulated rainwater, in running through the various decks of the offshore platform, will pick up and accumulate a certain amount of debris.

When this excessive flow of water eventually reaches the separator at the platform's lower deck, the latter is often strained to keep up the separation process. The outcome is that the water eventually overflows the separator, carrying with it amounts of crude oil, both of which are washed overboard.

BRIEF STATEMENT OF THE INVENTION

To overcome or obviate the above-stated problem, there is hereinafter disclosed an emulsion separator which is capable of accommodating an excessive flow of water, particularly rainwater, along with a minimal amount of crude oil such that the two components can be readily dealt with.

The unit includes means for not only separating or breaking the emulsion into heavier and lighter components, it also allows for upward movement of the light or hydrocarbon component into an expansion space. Here it can be removed through a multi-level discharge facility.

It is, therefore, an objective of the invention to provide an emulsion-breaking apparatus, particularly for use at an offshore platform. The apparatus is adapted to not only separate the emulsion into its liquid components but also to allow for an excessive flow of the water component which would occur in the instance of excessive rain suddenly falling on the platform.

DRAWINGS

In the drawings, FIG. 1 is an elevation view of the subject separator as used on offshore structures.

FIG. 2 is an enlarged view of the apparatus taken along line 2—2 in FIG. 1.

Referring to the drawings, the emulsion separator is illustrated on an offshore producing platform (10) of the type which is normally positioned at a working site, either for drilling or for producing the crude oil. Platform (10) includes major components comprised of a series of vertically spaced decks (11) and (12), which house the equipment and the supplies for the producing operation. Primarily, platform (10) includes several decks, as noted, together with support legs (13) and (14) which are embedded into the ocean floor (16) and which support the decks a predetermined height above the water surface (17).

While not shown in detail, gutters or guides (18) are provided with means for directing rain water from the various decks into a common collector, where it can be disposed of.

If the rainwater does not become tainted due to contact with oily parts of platform (10) it can be passed directly back into the adjacent body of water. However, experience has taught that a considerable amount of the water will fall onto the various decks, and in draining therefrom, will accumulate and pick up not only particulate material, but also a certain amount of crude oil. This results merely by flowing along the decks and other surfaces that have been contacted by the crude product.

Referring to FIG. 1, Separator unit (21) as shown, is normally positioned at the lowest deck (12) or beneath the lowest deck such that a gravity flow of the collected liquid will be deposited into a receiving tank (22). The latter can be fixed to a leg (13) of the platform such that overflowing water will pass directly from the separator into the surrounding water or into a disposal downcomer.

The rainwater is funnelled to separator (22) from a plurality of gutters (18) or similar guides which are attached to the deck for that purpose. In separator (21), the emulsion as mentioned is quiescently guided so that the crude oil component rises and forms a pad or layer (23) on top of the water component (24).

Separator (21) includes primarily, receiving tank or a receptacle (22), preferably in the form of a cylindrical member made of steel or other appropriate material. The lower end of the cylindrical tank is converged into a conical sump (25), terminating at a sand trap (26) which collects downwardly flowing solid material.

Solid material is periodically removed from sump (25) through a valved conduit (27). To facilitate removal of the solid matter, the tank can be provided with a nozzle or jet member (28) which is communicated with a pressurized source (29), preferably of water or air. In brief, the periodic introduction of a pressurized water stream into the collected solids will cause the latter to flow more readily rather than to accumulate and tend to solidify.

Inlet port (31) to tank (22) can take the form of a conduit or conductor which enters the tank a sufficient distance from the tank upper end to define an expansion chamber (32) beneath the tank cover (33), and the surface of the accumulated hydrocarbon pad (23) which will build up in the tank. Since the incoming rush of rainwater will tend to create a turbulent condition within the tank, a baffle (35) is provided at inlet port (21). Baffle (35) includes an upper panel which forms a closure to the downward extending baffle wall (34). The latter is in turn fastened to the tank inner wall.

Baffle (35) functions to decrease the inward rush of water and direct it downward toward emulsion collected in tank (22). The normal flow of emulsion as it discharges from baffle (35) will carry it downwardly toward the tank's lower end, thereby giving the solid component momentum to fall toward sand trap (26). The emulsion on the other hand will be in a turbulent condition and not prone toward separation into heavier and lighter components until such condition is overcome.

Tank (22) is provided with an internal flow stabilizer (36), having the specific function of interrupting the turbulent emulsion flow from entry chamber (37), and allowing both emulsion components to flow into separating compartment (38). The stabilizer will thus form a multiplicity of upwardly flowing emulsion streams in said compartment.

Under such a condition, gravity separation of the lighter hydrocarbon component from the water component, can be more readily achieved even though the vertical distance traveled by the lighter liquid is relatively short.

As the hydrocarbon component rises to the surface of the water, it will accumulate into pad (23). The water or oil-free component will enter into a second baffle channel (41) defined by an interval shield (42) fastened to the water discharge port (43). The said port (43), as shown, is at a lower elevation than the emulsion inlet port (31), thereby assuring the discharge of the water through said port (43) so long as it rises through the tank.

Discharge port (43) is provided with a water leg, including an upward rising section (46), which terminates in downcomer pipe (47). The open lower end of the latter can enter a discharge pile not shown or can be terminated in the body of water surrounding platform (10). The upper end of the leg (44) is further provided with a vacuum breaker (48), which as the name implies, avoids the possibility of a vacuum buildup in this pipe segment which might interfere with discharging water.

Flow stabilizer (36), which is positioned within tank (22), on a pivotal support member (51) which allows the stabilizer to be adjusted from a tilted position to define emulsion entry and separation portioners into a relatively vertical orientation. The latter dispatch facilitates removal of stabilizer (36) upwardly through the tank when the latter is emptied, or even when it contains emulsion.

Stabilizer (36) is comprised in one embodiment of a rigid frame member which is open at the forward and the rear faces. The stabilizer in one embodiment comprises an emulsion passing bed (56) of a fibrous or similar material. The fibers are so packed to define random passages that allow flow of the emulsion there through at a reasonable rate such that the discharge side of stabilizer (36) will form a series of generally upwardly directed streams of emulsion. The latter, although they may be upwardly flowing, will be more adapted for separation of the hydrocarbon content from the lower water component.

As the hydrocarbon or crude oil accumulates at the water's surface in pad (23), the pad will grow until it reaches sufficient quantity to be pumped off. The upper end of tank (22) is thus provided with a series of oil discharge ports (52), (53) and (54). Said ports are spaced vertically apart, the upper most terminating adjacent to tank cover (33).

The oil discharge means at the upper side of tank (22) is arranged such that pad (23) will be upwardly displaced as the volume of the water component is increased as a result of excessive rainfall. Thus, even though pad (23) becomes thinner due to excessive water, it will nonetheless be urged higher and higher into the expansion chamber space (32).

As pad (23) continues to rise through chamber (32) in response to the increased water intake, the pad is removed by pumping through one of the discharge ports (52), (53) or (54), depending on the height to which the pad is elevated as the surface of the water rises into said chamber (32).

Under the usual excess water condition, removal of the water and discharge thereof will be achieved without concern for backing up onto the offshore structure for inadvertent discharge of oil overboard.

It is understood that although modifications and variations of the invention can be made without departing from the spirit and scope thereof, only such limitations should be imposed as are indicated in the appended claims.

We claim:

1. A separator for breaking an emulsion comprised of an aqueous component having a greater specific gravity than a produced component, the latter being comprised of a liquid hydrocarbon component and particulated solids, said separator having means for handling an overload of said aqueous component and comprising:

a receiving tank;

means defining an expansion chamber at the receiving tank upper end;

an emulsion permeable stabilizer means positioned in said receiving tank to form an inlet chamber and an emulsion separating compartment below said expansion chamber;

a downflow inlet means for receiving a stream of said emulsion in said inlet chamber said emulsion permeable stabilizer means being aligned to receive emulsion entering said receiving tank, and to discharge a non-turbulent flow thereof into said separating compartment to cause an upward flow of the liquid hydrocarbon component whereby to form a floating pad thereof at the surface of the aqueous component;

first discharge means in communication with the separating compartment to conduct the aqueous component therefrom; and second discharge means in communication with said expansion chamber to conduct either the liquid hydrocarbon component, or the aqueous component therefrom, said second discharge means including a plurality of discharge ports opening into said expansion chamber being spaced vertically apart to sequentially drain aqueous component which rises into the expansion chamber as a result of said aqueous component overloading the receiving tank.

2. In the apparatus as defined in claim 1, wherein said receiving tank includes a cover thereon defining said liquid expansion chamber between the cover and the emulsion upper surface.

3. In the apparatus as defined in claim 1, wherein said stabilizer means is operably mounted within the tank to facilitate removal thereof from the tank.

4. In the apparatus as defined in claim 1 wherein said stabilizer means is pivotally mounted at its lower end in said tank to define said emulsion entry chamber and said emulsion separating compartment.

* * * * *